US009697801B2

(12) United States Patent
Fulton (10) Patent No.: US 9,697,801 B2
(45) Date of Patent: Jul. 4, 2017

(54) PLOTTER INCLUDING A DISPLAY CONTROL FOR GENERATING AND SUPPLYING IMAGE DATA FOR USE BY A DIGITAL DISPLAY DEVICE TO CONTROL A STATE OF ONE OR MORE PIXELS (71) Applicant: BAE SYSTEMS plc, London (GB)

(72) Inventor: Robin George Fulton, Rochester (GB)

(73) Assignee: BAE SYSTEMS plc, London (GB)

( * ) Notice: Subject to any disclaimer, the term of this patent is extended or adjusted under 35 U.S.C. 154(b) by 20 days.

(21) Appl. No.: 14/492,429

(22) Filed: Sep. 22, 2014

(65) Prior Publication Data
US 2015/0009203 A1   Jan. 8, 2015

Related U.S. Application Data (63) Continuation-in-part of application No. PCT/GB2013/050680, filed on Mar. 18, 2013.

(30) Foreign Application Priority Data

Mar. 22, 2012 (GB) .................................. 1205017.5

(51) Int. Cl.
G09G 5/18    (2006.01)
G09G 5/397   (2006.01)
(Continued)

(52) U.S. Cl.
CPC ............. *G09G 5/18* (2013.01); *G02B 27/017* (2013.01); *G09G 5/397* (2013.01); G09G 1/07 (2013.01);
(Continued)

(58) Field of Classification Search
CPC   G09G 5/18; G09G 5/20; G09G 5/397; G09G 5/399; G09G 3/346; G09G 3/2007
See application file for complete search history.

(56) References Cited

U.S. PATENT DOCUMENTS 4,366,476 A   12/1982 Hickin
5,448,302 A   9/1995  DesJardins
(Continued)

FOREIGN PATENT DOCUMENTS

WO   2013140143 A1   9/2013

OTHER PUBLICATIONS

International Preliminary Report on Patentability received for Patent Application No. PCT/GB2013/050680, mailed on Oct. 2, 2014, 10 pages.
(Continued)

*Primary Examiner* — Ryan A Lubit
(74) *Attorney, Agent, or Firm* — Finch & Maloney PLLC (57) ABSTRACT The present invention relates to a digital display plotter for plotting images on a digital display device 18. A cursive imagery generator 12 generates imagery inputs at a plurality of respective update phases during a refresh period of the display device. A control 20 for the display device activates selected pixels of the digital display device in response to respective said imagery inputs, activation being controlled subsequent to each update phase during a refresh period. An input store 14, 16 associates each cursively generated imagery input with an update phase that the imagery input was generated during a refresh period. The control 20 is responsive to the input store and configured to deactivate the selected pixels activated in response to each imagery input dependent on the associated update phase of each imagery input.

17 Claims, 5 Drawing Sheets (51) Int. Cl.
*G02B 27/01* (2006.01)
*G09G 1/07* (2006.01)
*G09G 3/20* (2006.01)
*G09G 3/34* (2006.01)
*G09G 5/20* (2006.01)
*G09G 5/399* (2006.01)

(52) U.S. Cl.
CPC .......... *G09G 3/2007* (2013.01); *G09G 3/346* (2013.01); *G09G 5/20* (2013.01); *G09G 5/399* (2013.01); *G09G 2310/0224* (2013.01); *G09G 2340/10* (2013.01)

(56) References Cited

U.S. PATENT DOCUMENTS

| | | | | |
|---|---|---|---|---|
| 5,528,738 | A * | 6/1996 | Sfarti | G06T 11/40 345/443 |
| 6,195,086 | B1 * | 2/2001 | Perlman | G09G 5/12 345/1.1 |
| 6,201,521 | B1 | 3/2001 | Doherty | |
| 2005/0184993 | A1 * | 8/2005 | Ludwin | G09G 3/3611 345/502 |
| 2007/0024524 | A1 * | 2/2007 | Lai | G06F 3/1431 345/1.1 |
| 2007/0200839 | A1 * | 8/2007 | Sampsell | G09G 3/20 345/204 |
| 2007/0285428 | A1 * | 12/2007 | Foster | G06F 3/14 345/503 |
| 2008/0088909 | A1 | 4/2008 | Hui | |
| 2010/0026694 | A1 * | 2/2010 | Kato | G09G 5/39 345/539 |
| 2010/0265260 | A1 * | 10/2010 | Swic | G09G 5/399 345/539 |
| 2012/0007872 | A1 * | 1/2012 | Filipov | G09G 5/393 345/531 |
| 2014/0285502 | A1 * | 9/2014 | Hobbs | G06F 3/14 345/520 |

OTHER PUBLICATIONS

International Search Report and Written Opinion of the International Searching Authority received for Patent Application No. PCT/GB2013/050680, mailed on Jul. 4, 2013, 14 pages.
GB Intellectual Property Office Search Report under Section 17(5) received for GB Patent Application No. 1205017.5 mailed Jul. 18, 2012, 4 pages.
GB Intellectual Property Office Search Report under Section 17 and 18(3) received for GB Patent Application No. 1304887.1, mailed Jul. 30, 2013, 6 pages.
Van Kessel, Peter F., et al., "A MEMS-Based Projection Display," Proceedings of the IEEE, vol. 86, No. 8, Aug. 1, 1998. pp. 1687-1704.

* cited by examiner

PLOTTER INCLUDING A DISPLAY CONTROL FOR GENERATING AND SUPPLYING IMAGE DATA FOR USE BY A DIGITAL DISPLAY DEVICE TO CONTROL A STATE OF ONE OR MORE PIXELS

RELATED APPLICATIONS

This application is a continuation-in-part of International Application PCT/GB2013/050680, filed on Mar. 18, 2013, which in turn claims priority to GB Application No. 1205017.5, filed on Mar. 22, 2012. Each of these applications is herein incorporated by reference in its entirety.

FIELD OF THE DISCLOSURE

The present invention relates to a method and apparatus for generating and supplying image data for use by a digital display device such as a digital micro-mirror device to display an image.

BACKGROUND

A digital display device comprises an array of pixels which can each be in an 'on' state or an 'off' state. A process for generating an image for display may comprise determining which pixels should be in an 'on' or 'off' state at any one time in order to define a required image on the display device. Typically, a data set may be generated that is useable by the display device to control the state of any one or more of the pixels thereby to generate a desired image.

For the purposes of the present patent application, the process of receiving input data defining a graphical element to be displayed and of defining the state of one or more pixels in a digital display device in order to display that graphical element will be referred to as 'plotting'. Devices implementing such a plotting process will be referred to as 'plotters' and the meaning of the verb 'to plot', and its various tenses, are be interpreted accordingly.

Known image generators for cathode ray tube (CRT) type displays may be configured to operate in either a raster mode or a cursive mode. In a raster mode, an image is generated by controlling the state of the pixels in sequence, usually in horizontal lines, starting each display frame at the pixel at the top left of the display and ending at the pixel at the bottom right of the display. In a cursive mode, an image is defined in terms of geometric graphical elements such as a lines or curves to be displayed at defined positions within an array of pixels. Input image data are therefore 'plotted' to 'draw' the defined graphical elements on the display device starting at a defined pixel and passing through other defined pixels. Raster mode is typically preferred when the state of most or all of the pixels of a display will be changing frequently, for example if a video image is displayed. Cursive mode on the other hand is preferred when symbols are displayed which occupy only a small portion of the image area of the display device.

Digital display devices, such as digital micro-mirror devices or Rapid Update digital display devices, offer many advantages over CRT displays because they are typically lighter, smaller and can operate using low voltages. However, the process of plotting an image defined in terms of geometrical symbols for such a display device may incur a delay and it is desirable to provide a process for generating and displaying images so defined with reduced latency.

Typically a plotter will plot one or more images into an image buffer during a refresh period of a corresponding display device and when all of the elements of the image or images have been assembled in the buffer, the resultant image data may be transferred to the digital display device for display. An example of a typical display device and image generating technique is described with reference to FIGS. 7 and 8. At the start of a cycle, or refresh period RP, an image generator 100 generates imagery inputs 1 to 4 representing portions of an image which are transferred sequentially with respect to time 't' for representation in an image buffer 102. The image buffer adds together the imagery inputs such that at a time t=4 it contains inputs 1, 2, 3, 4. The content of the image buffer is shown diagrammatically in FIG. 8 for each of times t=1, 2, 3 and 4. As shown the image contained in the buffer at time t=4 is a square and the imagery inputs define the sides of the square which are generated one after another. Once the full image (i.e. the square) is received, it is transferred to a digital display device 104 for display. The time taken to transfer the full image to the display is the transport period TP and is represented by the downwardly sloping arrow between the buffer 102 and display device 104 in FIG. 7.

Figure 7:
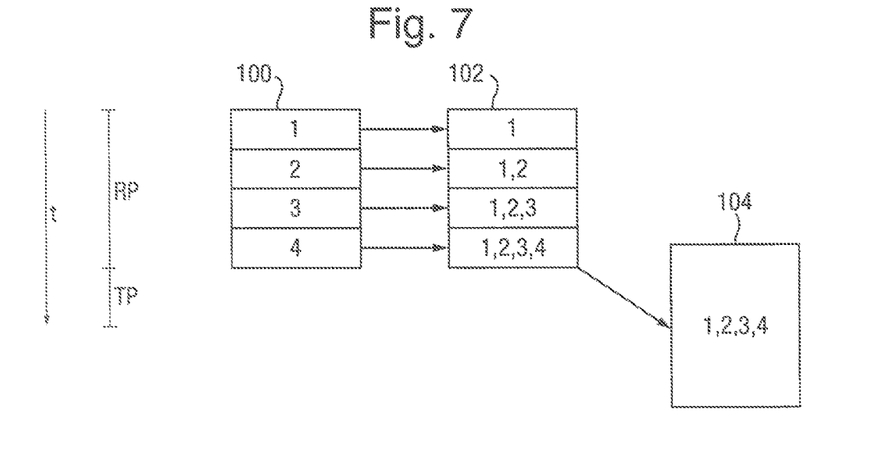
FIG. 7 shows a schematic representation of a known plotter.
Figure 8:
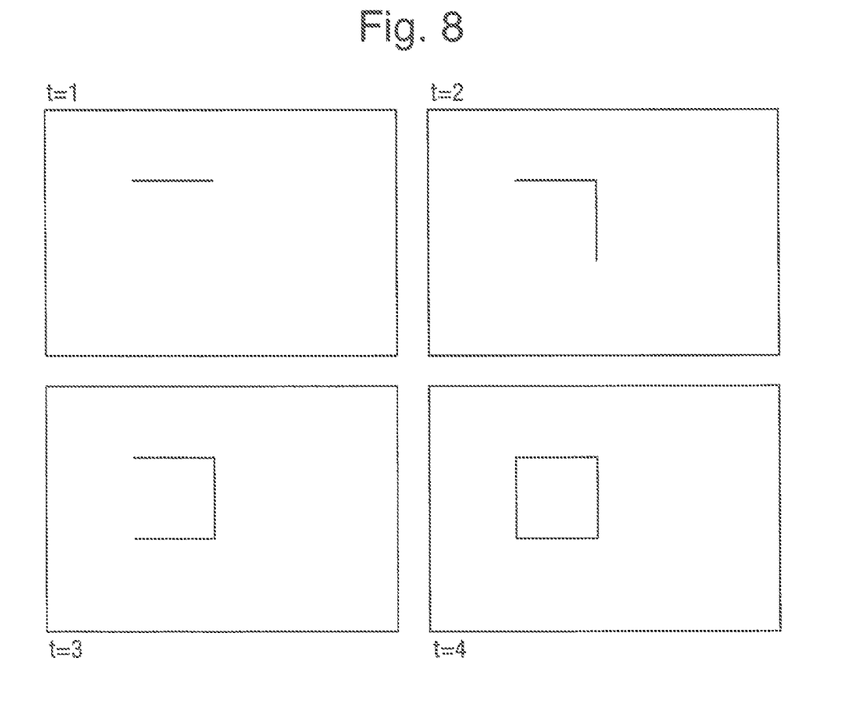
FIG. 8 shows diagrammatically plots drawn to a display.

It will be seen there is a delay between the start of a cycle at a time t=0 and the reproduction of the full image by the device 104 which is equal to the refresh period plus the transport period.

SUMMARY

An embodiment of the present invention seeks to reduce the delay between image generation and display.

According to one aspect, the present invention provides a plotter for a digital display device, comprising:

an input for receiving imagery inputs, each defining at least a portion of an image to be displayed, at a periodicity determined at least in part by an update period for the digital display device, each receipt of imagery input being associated with one of a plurality of update phases during an image refresh period of a predetermined duration;

an output for outputting image data to the digital display device corresponding to a received imagery input, defining selected pixels to be activated at the display device beginning at the one or a plurality of update phases during the image refresh period thereby to display the at least a portion of an image represented by the received imagery input; and a display control, arranged:

upon receipt, at one of a plurality of update phases within a first said image refresh period, of a first imagery input defining at least a portion of an image to be displayed, to output corresponding image data at the output and to store the first imagery input in an image buffer;

upon receipt of a second imagery input at the same said one of a plurality of update phases within a subsequent said image refresh period, to output image data corresponding to a removal of the at least a portion of an image represented by the stored first imagery input, read from the image buffer, mixed with image data corresponding to the second imagery input, wherein at any given one of the plurality of update phases during the subsequent said image refresh period, the display control is arranged to output image data to update only those defined pixels as correspond to imagery input received at the same said one of the plurality of update phases within the first and the subsequent said image refresh period.

In this way, an image may be updated without incurring delays associated with assembling and transmitting an entire image, only those portions of the image that need to be updated at each update phase are represented in output image data.

In one example embodiment, the display control is arranged to output image data for activating selected pixels in accordance with any one of a plurality of brightness levels of the received imagery inputs, and the plotter further comprises a brightness store for storing the brightness level of each pixel activated by the display control, and wherein the display control is configured to change the brightness level of an activated pixel only if the brightness level to be activated is greater than or equal to the brightness level stored in the brightness store.

Optionally, the imagery inputs correspond to respective raster lines in a raster mode of display. In such an embodiment, the imagery inputs received in consecutive image refresh periods correspond to alternate raster lines and the display control is configured to activate selected pixels such that the raster lines generated during one refresh period are interlaced with the raster lines generated during a subsequent refresh period.

In a further example embodiment, the image buffer comprises memory locations corresponding to the different update phases of a refresh period.

In a further example embodiment, the image buffer includes first and second image buffers that comprise memory locations corresponding to the different update phases of a refresh period, so as to provide a dual buffer arrangement for adding and removing images from the display device.

According to a second aspect, the present invention provides a method of plotting an image on a digital display device, comprising:

receiving, at one of a plurality of update phases within a first predetermined image refresh period, a first imagery input defining at least a portion of an image to be displayed, said plurality of update phases having a periodicity determined at least in part by an update period for the digital display device;

outputting image data to the digital display device corresponding to the first received imagery input, defining selected pixels to be activated at the display device beginning at said one of a plurality of update phases;

receiving a second imagery input at said one of a plurality of update phases within a subsequent said predetermined image refresh period; and outputting image data corresponding to a removal of the at least a portion of an image represented by the first imagery input mixed with image data corresponding to the second imagery input, wherein at any given one of said plurality of update phases during the subsequent said predetermined image refresh period, only those pixels are updated by output image data as correspond to imagery input received at the same said one of said plurality of update phases of the first and of the subsequent said predetermined image refresh period.

According to a third aspect, the present invention provides a helmet mounted display, head mounted display or head up display including a plotter defined according to the first aspect of the present invention, or implementing a method of plotting an image according to the second aspect of the present invention.

BRIEF DESCRIPTION OF THE FIGURES

In order that the present invention may be well understood, an embodiment thereof, which is given by way of example only, will now be described with reference to the accompanying drawings, in which.

DETAILED DESCRIPTION

Figure 1:
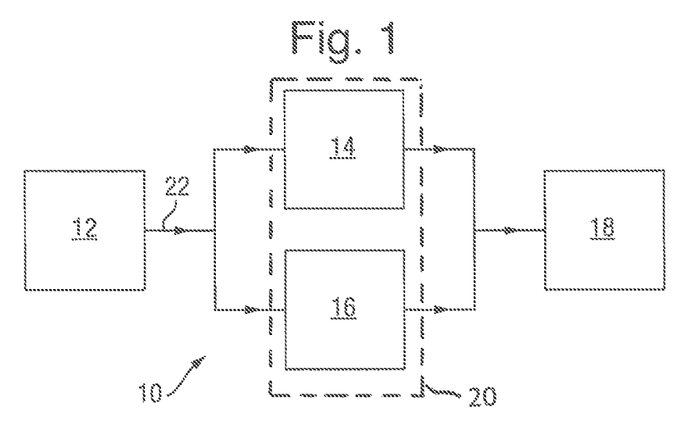
FIG. 1 is a schematic representation of a plotter for a digital display device.

Referring to FIG. 1, an image generation and display system 10 is shown for generating and displaying images on a digital display device 18, such as a digital micro-mirror device (DMD). Whilst the present description refers predominantly to DMDs, it will be appreciated that the present disclosure applies to other types of digital display devices.

A micro-mirror display comprises an array of micro-mirrors which can be individually and selectively activated by controlling the angle at which they reflect incident light. The array of micro-mirrors corresponds to pixels in a display. In an 'on' state a mirror reflects light for forming an image and in an 'off' state a mirror reflects the light to a light dump. A DMD has an update period which may vary from one type of device to another or may be selected by the system designer dependent on the required performance of the system. The update period is the duration which the mirrors can be controlled to be held in either an 'on' state or an 'off' state. For example, if a colour display is required, the update period would need to be around three times shorter than for a monochromatic display in order to display three primary colours. By way of example, a typical update period may be between about 200 μs and 600 μs meaning that the mirrors can be controlled to change state every 200 to 600 μs. A display is required to maintain an image for a minimum duration to allow proper perception by a human observer. A display refresh period of 16 or 20 ms is typical. Accordingly, the state of each pixel in the DMD can be changed many times in a refresh period, for example a DMD update period of 572 μs means that the state of a mirror can be changed 35 times in a refresh period of 20 ms.

In the prior art image plotting technique described above in relation to FIGS. 7 and 8, the imagery inputs are first input to the image buffer and transferred to the display after each refresh period. The earliest time therefore that the state of a plotted pixel will be changed or 'unplotted' on the display is at the end of the subsequent refresh period. Therefore, the image displayed is maintained on the display for a sufficient period to allow proper perception by a viewer. However, this image plotting method also incurs latency in the system.

Figure 2:
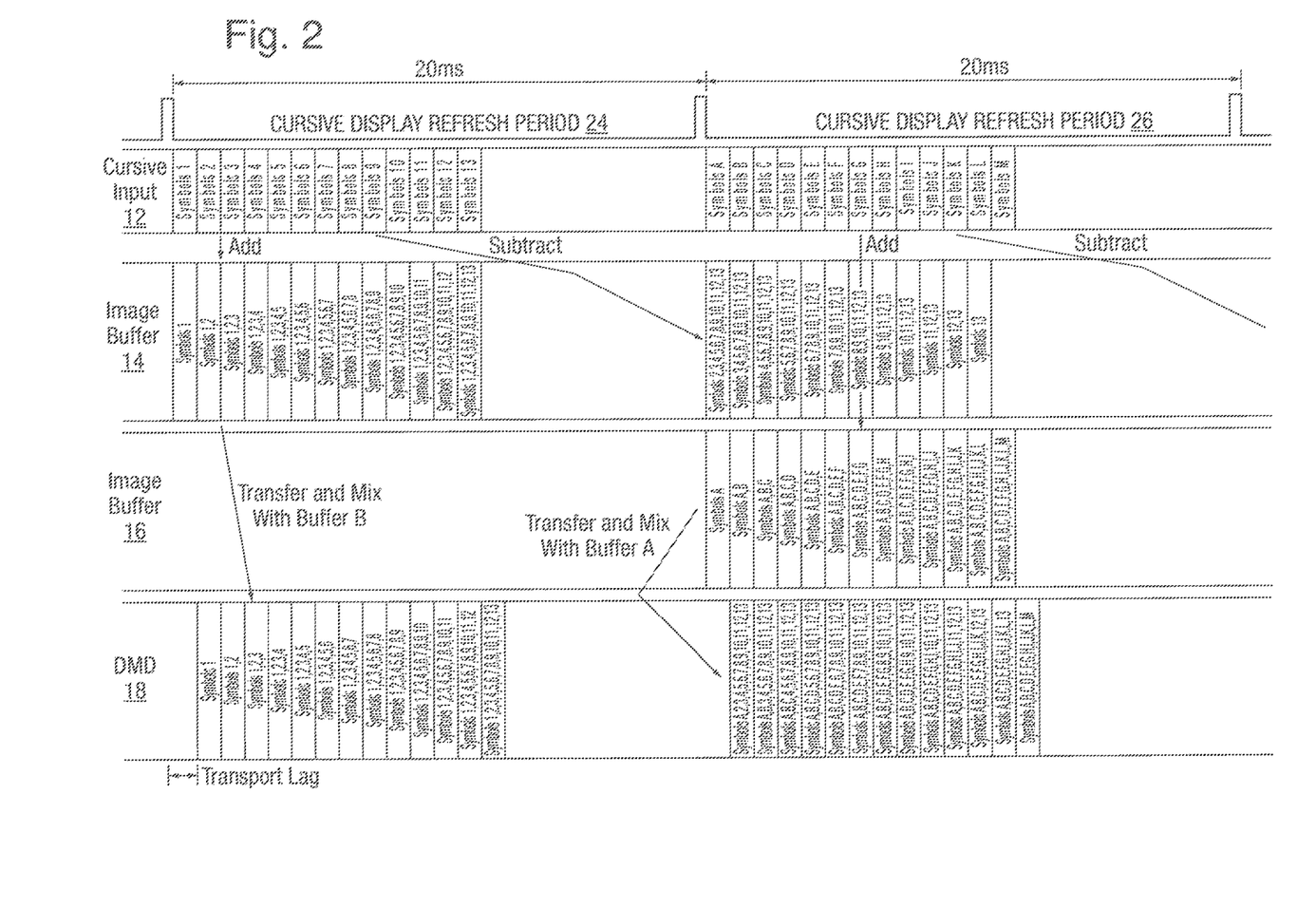
FIG. 2 shows the generation of imagery inputs by an image generator, storage of the imagery inputs in two image buffers and control of the digital display responsive to the imagery inputs.

In the present arrangement as shown in FIGS. 1 and 2, a so-called 'cursive imagery' generator 12 is arranged for generating multiple imagery inputs 22, each imagery input 22 representing a symbol or one of a succession of parts of a symbol to be plotted or one of a succession of portions of an image to be displayed that may be plotted onto a pixel array of a display device. Each imagery input 22 is provided at a different update phase over successive refresh periods for input to an input store which in this embodiment comprises a first image buffer 14 and a second image buffer 16. The contents of the image buffers 14, 16 are then selectively transferred to the DMD 18 by way of display control 20. In this example embodiment, the first and second image buffers 14, 16 are included within control 20. In other embodiments, the first and second image buffers 14, 16 may be external to, and accessible by, control 20. In still other embodiments, the display control 20 and the first and second image buffers 14, 16 may be included within display 18. In a more general sense, display control 20 receives imagery input 22 and selectively outputs data to display 18, and has links to the first and second buffers 14, 16. Other suitable such configurations and arrangements will be apparent in light of this disclosure.

In more detail and referring to FIG. 2, during a first refresh period 24, imagery inputs (Symbols 1 to 13) are generated by the cursive imagery generator 12. Only the first thirteen inputs are shown in the Figure. In this example, the imagery inputs are generated at an update rate of one input per approximately 600 μs. When generated, the imagery inputs are added to the first image buffer 14 so that after 13 update phases, the first image buffer contains symbols 1 to 13. When added to the first image buffer, each imagery input is associated with its corresponding update phase. Association may be performed by inputting the imagery inputs into memory locations corresponding to the update phase at which it was generated. Other methods of associating imagery inputs with the corresponding update phase will be apparent to those skilled in the art.

When each imagery input is received by the first image buffer, it is transferred to the DMD, unlike in the prior art in which the imagery inputs are input to the display only after each refresh period. There is a transfer delay of approximately 200 μs for transferring the imagery input from the buffer to the DMD. The DMD has a mirror settling time of 20 μs when its state is changed. Accordingly, the first image plotted on the DMD in refresh period 24 is symbol 1 approximately 220 μs after its corresponding imagery input has been generated. The same applies to symbols 2 to 13 which are plotted a short time after their corresponding input has been generated. Compared to the prior art method which has a latency of more than 20 ms, the present method is capable of displaying images very much more quickly. It should also be noted and as described below that not only does the present arrangement have reduced latency, but additionally it is configured to maintain imagery plots on the DMD for a refresh period of 20 ms to allow proper perception.

During a second refresh period 26, imagery inputs A to M are generated and are added in sequence to the second image buffer 16. Each input A to M is associated with the update phase at which it was added to the second image buffer. In this example, the content of the second image buffer at update phase 1 of the second refresh period is symbol A. The imagery inputs generated during the previous refresh period 24 are subtracted from the contents of the first image buffer 14 at the same update phase that they were added to the first image buffer during the first refresh period. In this example, symbol 1 is subtracted at update phase 1 so that the content of the first image buffer at update phase 1 of the second refresh period is symbols 2 to 13. The content of the first image buffer and the second image buffer are mixed and transferred to the DMD 18. In this example, the images displayed on the DMD at update phase 1 of the second refresh period are symbols A, 2 to 13. Over the update phases of the second refresh period, symbols 1 to 13 are removed from the DMD in the order that they were added to the DMD in the first refresh period. Accordingly, each image is maintained on the DMD for a refresh period.

In a third refresh period (not shown), the symbols A to M are removed from the DMD in the order that they were added to the DMD in the first refresh period. This cycle continues during subsequent refresh periods in which the images added during one refresh period are removed during a consecutive refresh period at the same update phase in the consecutive refresh period that they were added in the previous refresh period.

The present example adopts an input store comprising a dual buffer arrangement for adding and removing images from the display. It will be apparent to those skilled in the art that other input stores may be used.

The present disclosure also applies to generation of inputs to a display in a raster mode, when for example the display is used to display video images. As indicated above in relation to the prior art, in raster mode, images are added line by line from left to right of a display and from top to bottom. A line may be considered to be a cursively generated imagery input in the context of the present application, although such raster mode imagery inputs have regular starting positions and vectors. In this regard, an imagery input in its most general sense comprises a line (or curve) extending from a start position at any point of the display by a distance determined by its vector (for example, the start position may be a corner of a square and the vector extends along a side of the square). In raster mode, the imagery inputs comprise pixel states along horizontal lines extending from a start position at the left of a display to the right of the display. At successive update phases of a first refresh period, pixels are addressed in selected lines from the top to the bottom of the display. In a subsequent refresh period the state of pixels in those lines that were selected during associated update phases are reset and further pixels are addressed. Accordingly, the display control 20 is responsive to the input store so that selected pixels activated for forming a raster line of the display are deactivated no earlier than the associated update phase of the second subsequent refresh period.

In a modification using interlacing, the inputs generated during consecutive refresh periods define pixel states in alternate lines from the top to bottom of a display. For example, one refresh period defines pixel states in lines 1, 3, 5, etc and the next refresh period defines pixel states in lines 2, 4, 6, etc. When viewed together sufficiently rapidly a viewer views the alternate lines of pixels together. In an embodiment of the invention in raster mode, a raster line should not be removed prematurely before it has had sufficient time to be perceived by a user. The odd lines are removed from the display as the even lines are plotted and the observer integrates the odd and even fields in his head. Each line on the display is retained for one 20 ms refresh period, or field. The lines of the new field will overwrite the previous field's lines with zero brightness prior to plotting the new field lines. Accordingly, the display control 20 is responsive to the input store so that selected pixels activated for forming a raster line of the display are deactivated no earlier than the associated update phase of the subsequent refresh period following activation.

The arrangements described above relate to a display without variable brightness in which an image is generated by switching selected pixels to an 'On' state for one or more refresh periods. Typically, symbols are displayed at constant (typically 100%) brightness so that they can readily be perceived by a viewer, particularly if the images are to be viewed against a relatively bright background. In aircraft displays for example, the symbology may include altitude, heading or other information about the aircraft or the environment. The above described arrangement may be modified to allow images of variable brightness to be displayed. The present disclosure is however applicable to displays in which the brightness of pixels can be varied.

Figure 3:
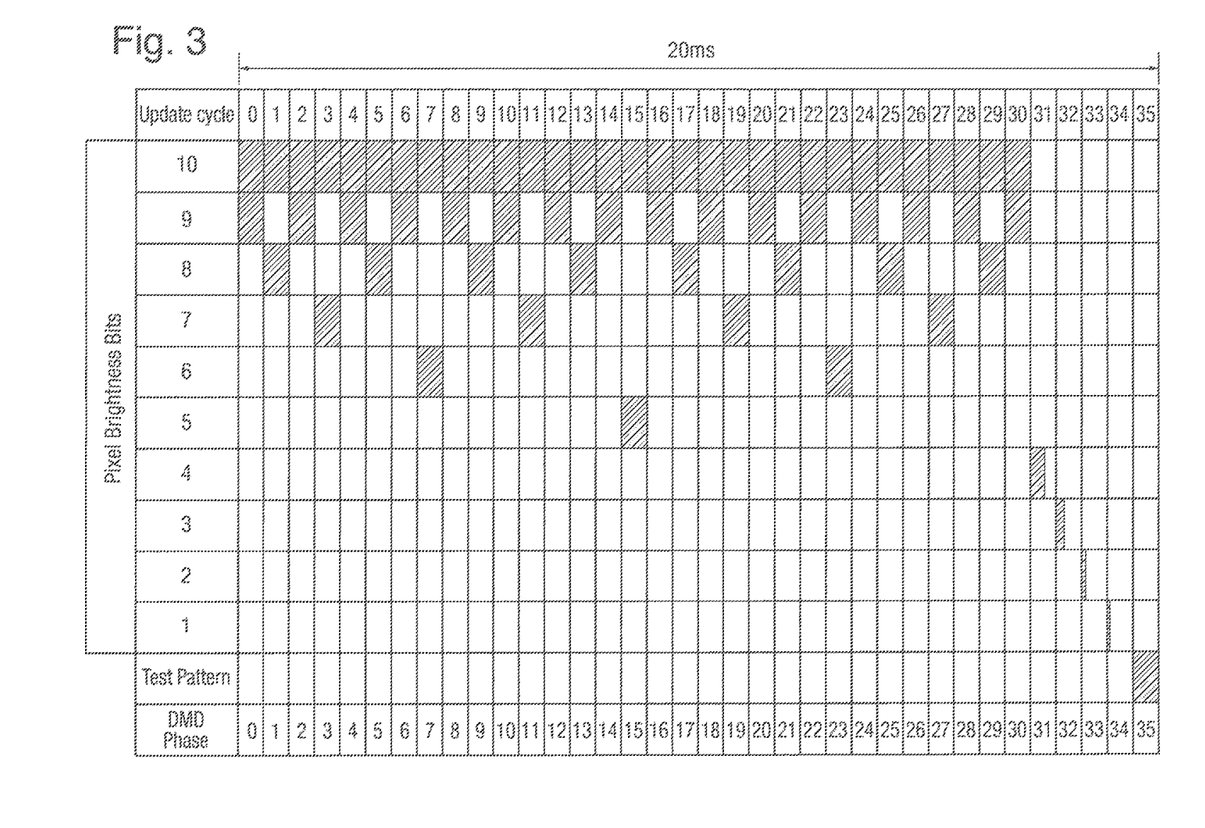
FIG. 3 shows control of a pixel of the display for generating any one of a plurality of brightness levels.

As shown in FIG. 3 in one arrangement in which brightness can be varied, particularly as used in known digital micro-mirror devices, the brightness of each pixel can be determined by summing the time its pixel mirror is in the 'on' state and shades of gray can be obtained by modulating the mirrors with a binary pattern of on and off periods. In FIG. 3, the update phases 0 to 35 extend in a horizontal direction and the brightness of the displayed pixel is shown in the vertical direction, where 1 is the least bright and 10 is full brightness. A pixel is indicated as being in an 'on' state if the relevant box is shaded. In this arrangement a pixel is at full brightness if it is 'on' for 30 update periods in a refresh period. A pixel may be displayed at brightness level 9 if it is an 'on' state every other update period for 30 update periods in a refresh period. Brightness levels 8 to 5 are achieved in a similar way by switching a pixel 'on' for progressively less time during a refresh period. Brightness levels 4 to 1 are achieved by switching a pixel' on for a fraction of an update period. One DMD phase (35) is reserved for testing the DMD mirrors. The arrangement described with reference to FIG. 3 is only one way in which the brightness of pixel may be varied (for example from brightness levels 1 to 10) however other arrangements are known or will be apparent to those skilled in the art.

Referring to FIGS. 2 and 3, for displaying at different brightness levels, an imagery input 22 is generated together with the brightness (levels 1 to 10) at which it is to be displayed. For example, Symbol 5 generated in the first refresh period 24 may have a brightness level 9. Symbol 5 is plotted to the display at update phase 5 of the first refresh period and may be unplotted no earlier than update phase 5 of the second refresh period. During the 20 ms between plotting and unplotting, the pixels required to display symbol 5 are alternatively in 'on' and 'off' states for a period 30 update phases. Accordingly, a viewer perceives symbol 5, because it is displayed for the minimum period of 20 ms, at a brightness level 9, and because brightness is perceived as the sum of the update phases in which the pixels are in an 'on' state.

Figure 4:
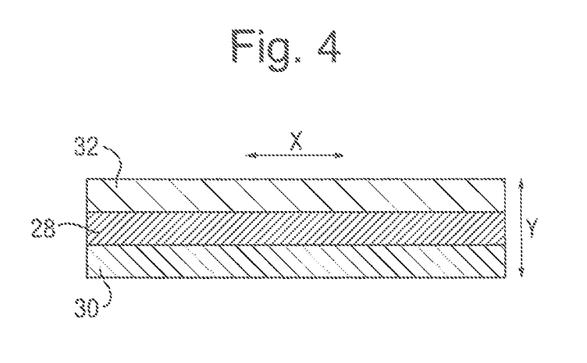
FIG. 4 shows a typical imagery input plotted to a digital display.

It has been indicated above that symbology is typically displayed at maximum available brightness (e.g. brightness level 10 in FIG. 3). Therefore, it may appear unnecessary to configure a display system for displaying symbology at different intensities. However, in many display systems, a viewer may have a manual control for reducing the intensity of displayed symbology, for example if a pilot wishes to view a map more clearly through a display without the distraction of bright symbology or if a display is being used in raster mode in which imagery inputs correspond to raster lines. Additionally, symbology is typically more than one pixel in dimension so that it is sufficiently large to be seen by the viewer. For example, FIG. 4 shows an imagery input comprising a line plotted in an 'X' dimension and having a lateral extent of three pixels in the 'Y' dimension. The centre portion 28 of the line is plotted at full brightness, whereas a lower lateral portion 30 is plotted at brightness level 9 and an upper lateral portion 32 is plotted at brightness level 8.

In some embodiments of the present invention, an anti-aliasing technique may also be applied, for example, when plotting lines defined in cursive imagery input data. In one known technique, published in "An Efficient Anti-aliasing Technique", Computer Graphics 25 (4): pages 143-152, ISBN 0-89791-436-8, pixel intensity may be varied either side of a defined line according to distance of the pixel from the line. In a modification to this known anti-aliasing technique, when anti-aliased lines overlap, a pixel brightness comparison may be applied to those pixels to be shared by the overlapping anti-aliased lines to set the brightness of the pixel to be displayed to be the greater of the determined pixel brightness for each line and so avoid over-writing a pixel of a given brightness with one of a lower brightness. In a further variation, a so-called 'add and saturate' approach may be taken with overlapping pixels in which the determined brightness of the pixels for each line is added and the resultant pixel brightness is used for display, but limited to the maximum brightness for the display.

Figure 5:
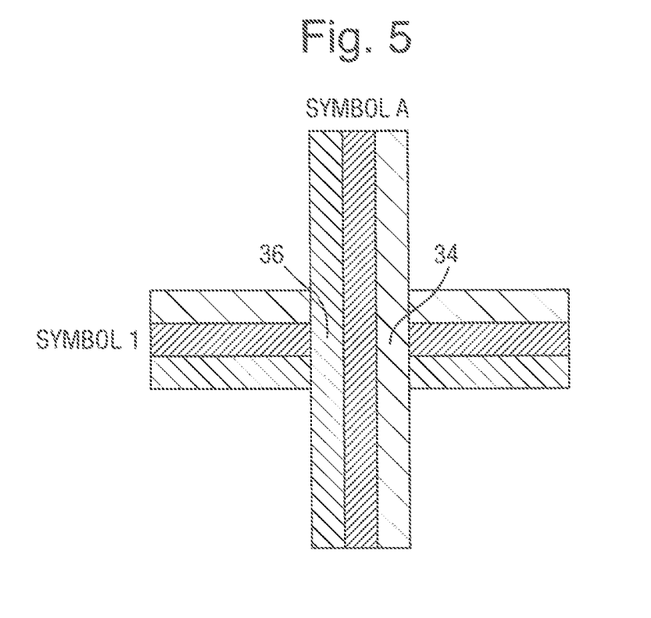
FIG. 5 shows two imagery inputs plotted to a digital display.

As described in relation to FIG. 2, an imagery input is plotted during one refresh period and unplotted at least one refresh period later. A second, or further, image may be plotted over the first image. For example, as shown in FIG. 5, a first imagery input 22 generated during a first refresh period 24 comprises the line as shown in FIG. 4 (SYMBOL 1) and a second imagery input 22 generated during a second refresh period 26 comprises a line (SYMBOL A) which is perpendicular to SYMBOL 1. When the display is configured to display at different intensities, and SYMBOL A is plotted over SYMBOL 1, the pixels of SYMBOL A are plotted over the pixels of SYMBOL 1 even if they are displayed at a lower intensity. For example, pixels 34 and 36 are at full intensity in refresh period 24 and then are over-plotted at intensity levels 8 and 9 respectively in refresh period 26. As a result, the displayed images appear disjointed.

Figure 6:
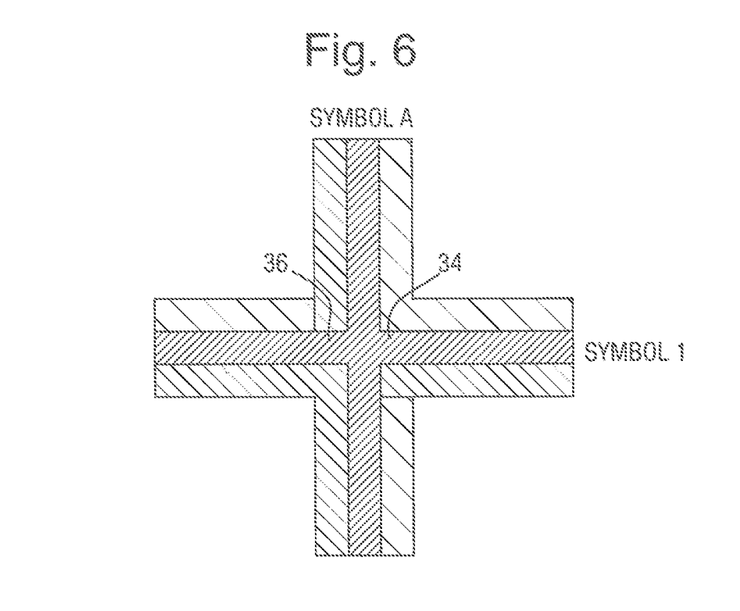
FIG. 6 shows the same imagery inputs plotted by an improved arrangement.

In a modification of the present display system, when an imagery input (SYMBOL A) is plotted over a previously plotted cursive input (SYMBOL 1) the over-plotted pixels of the subsequent input are plotted only if they are brighter than the pixels of the previous input. Referring for example to FIG. 6, pixels 34, 36 have a brightness level of 10 in cursive input for SYMBOL 1. When cursive input for SYMBOL A is plotted, the subsequent pixel would be plotted only if it had a brightness level of 9 or 10. If the subsequent pixel has a brightness level of 1 to 8 it would not be plotted. It should be noted that in this example and when considered generally, if a subsequent pixel has a brightness level which is the same as the brightness level of the previous pixel it may or may not be plotted, since the displayed image would not be affected.

Additionally, if a brighter subsequent pixel is plotted over a previous pixel the subsequent pixel must be maintained for a display period in order for it to be properly perceived by a viewer.

A plot store records the sequence of plots described by the cursively generated imagery inputs and thus allows the image to be un-plotted. The plot store associates the imagery inputs with their update phases to allow the unplotting to be applied at the correct time in the next display cycle. An image store holds the current brightness of each pixel. When any imagery line crosses an existing line the image store only allows the new line plots to overwrite the exiting line plots if they are brighter, preventing dimmer plots being obliterated. An image store DMD plot phase has a location for every pixel of the display and holds the DMD Phase on which the plot was made.

What is claimed is:

1. A plotter for a digital display device, the plotter comprising:
   a display control configured:
   upon receipt via an input operatively coupled to the display control, at a first update phase within a first image refresh period, of a first imagery input defining activation of a selected pixel representing at least a first portion of an image to be displayed, to store the first imagery input in a first image buffer;
   to output, to the digital display device, image data corresponding to the first imagery input as stored in the first image buffer for setting a state of the selected pixel during the first update phase within the first image refresh period, thereby causing the digital display device to display at least a portion of the image represented by the first imagery input;
   upon receipt via the input, at a second update phase within the first image refresh period, of a second imagery input defining activation of the selected pixel representing at least a second portion of the image to be displayed, to store the second imagery input in the first image buffer;
   to output, to the digital display device, image data corresponding to the second imagery input as stored in the first image buffer for setting the state of the selected pixel during the second update phase within the first image refresh period as stored in the first image buffer mixed with the image data corresponding to the first imagery input as stored in the first image buffer, thereby causing the digital display device to display at least a portion of the image represented by the first and second imagery inputs;
   upon receipt via the input, at a first update phase within a second image refresh period subsequent to the first image refresh period, of a third imagery input that does not define activation of the selected pixel, to store the third imagery input in a second image buffer and remove the first imagery input from the first image buffer;
   to output image data corresponding to a removal of at least the portion of the image represented by the first imagery input for setting the state of the selected pixel during the first update phase within the second image refresh period, the output image data being mixed with image data corresponding to the second and third imagery inputs as stored in the first and second image buffers, thereby causing the digital display device to display at least a portion of the image represented by the second and third imagery inputs;
   upon receipt via the input, at a second update phase within the second image refresh period, of a fourth imagery input that does not define activation of the selected pixel, to store the fourth imagery input in the second image buffer and remove the second imagery input from the first input buffer, and
   to output image data corresponding to a removal of at least the portion of the image represented by the second imagery input mixed with image data corresponding to the third and fourth imagery inputs as stored in the second image buffer for setting the state of the selected pixel during the second update phase of the subsequent image refresh period, thereby causing the digital display device to display at least a portion of the image represented by the third and fourth imagery inputs,
   wherein the first update phase within the first image refresh period is at a different time than the second update phase within the first image refresh period, and
   wherein the first update phase within the second image refresh period is at a different time than the second update phase within the second image refresh period.

2. The plotter as claimed in claim 1, wherein the display control is arranged to output image data for activating the selected pixel in accordance with any one of a plurality of brightness levels of the received imagery inputs, and the plotter further comprises a brightness store for storing the brightness level of the selected pixel activated by the display control, and wherein the display control is configured to change the brightness level of an activated pixel only while the brightness level to be activated is greater than or equal to the brightness level stored in the brightness store.

3. The plotter as claimed in claim 1, wherein each of the first, second, third and fourth imagery inputs correspond to respective raster lines in a raster mode of display.

4. The plotter as claimed in claim 3, wherein each of the first, second, third and fourth imagery inputs received in consecutive image refresh periods correspond to alternate raster lines and the display control is configured to activate the selected pixel such that the raster lines generated during the first image refresh period are interlaced with the raster lines generated during the second image refresh period.

5. The plotter as claimed in claim 1, wherein the first image buffer includes memory locations corresponding to each of the first and second update phases within the first image refresh period.

6. The plotter as claimed in claim 1, wherein the image buffer further includes a second image buffer that includes memory locations corresponding to the first and second update phases within the second image refresh period, so as to provide a dual buffer arrangement for adding and removing images from the display device.

7. The plotter as claimed in claim 1, wherein in response to anti-aliased lines overlapping, a pixel brightness comparison is applied to pixels to be shared by the overlapping anti-aliased lines, so as to set the brightness of the pixel to be displayed to be the greater of the determined pixel brightness for each line and so avoid over-writing a pixel of a given brightness with one of a lower brightness.

8. The plotter as claimed in claim 7, wherein the determined pixel brightness for each line is added and the resultant pixel brightness is used for display, but limited to maximum brightness for the display.

9. A helmet mounted display, head mounted display or head up display including a plotter as claimed in claim 1.

10. A method of plotting an image on a digital display device, the method comprising:
    upon receipt, at a first update phase within a first image refresh period, of a first imagery input defining activation of a selected pixel representing at least a first portion of an image to be displayed, storing the first imagery input in a first image buffer and outputting, to the digital display device, image data as stored in the first image buffer for setting a state of the selected pixel during the first update phase within the first image refresh period, thereby causing the digital display device to display at least a portion of the image represented by the first imagery input;
    upon receipt, at a second update phase within the first image refresh period, of a second imagery input defining activation of the selected pixel representing at least a second portion of the image to be displayed, storing the second imagery input in the first image buffer and outputting, to the digital display device, image data corresponding to the second imagery input as stored in the first image buffer for setting a state of the selected pixel during the second update phase within the first image refresh period mixed with the image data corresponding to the first imagery input, thereby causing the digital display device to display at least a portion of the image represented by the first and second imagery inputs;

upon receipt, at a first update phase within a second image refresh period subsequent to the first image refresh period, of a third imagery input that does not define activation of the selected pixel, storing the third imagery input in a second image buffer and removing the first imagery input from the first image buffer and outputting, to the digital display device, image data corresponding to a removal of at least the portion of the image represented by the first imagery input for setting the state of the selected pixel during the first update phase within the second image refresh period, the output image data being mixed with image data corresponding to the second and third imagery inputs as stored in the first and second image buffers, thereby causing the digital display device to display at least a portion of the image represented by the second and third imagery inputs; and upon receipt, at a second update phase within the second image refresh period, of a fourth imagery input that does not define activation of the selected pixel, storing the fourth imagery input in the second image buffer and removing the second imagery input form the first image buffer and outputting image data corresponding to a removal of the at least second portion of the image represented by the second imagery input for setting the state of the selected pixel during the second update phase of the subsequent image refresh period, the output image data being mixed with image data corresponding to the third and fourth imagery inputs as stored in the second image buffer, thereby causing the digital display device to display at least a portion of the image represented by the third and fourth imagery inputs, wherein the first update phase within the first image refresh period is at a different time than the second update phase within the first image refresh period, and wherein the first update phase within the second image refresh period is at a different time than the second update phase within the second image refresh period.

11. The method as claimed in claim 10, further comprising activating the selected pixel in accordance with any one of a plurality of brightness levels of the received imagery inputs, and changing the brightness level of an activated pixel only while the brightness level to be activated is greater than or equal to a stored brightness level associated with that pixel.

12. The method as claimed in claim 10, wherein the imagery inputs correspond to respective raster lines in a raster mode of display.

13. The method as claimed in claim 12, wherein each of the first, second, third and fourth imagery inputs received in consecutive image refresh periods correspond to alternate raster lines and the method further includes activating the selected pixel such that the raster lines generated during the first image refresh period are interlaced with the raster lines generated during the second image refresh period.

14. A helmet mounted display, head mounted display or head up display configured to carry out the method defined in claim 10.

15. A plotter for a digital display device, comprising:
a first image buffer for storing received imagery inputs to be plotted during respective update phases of a first image refresh period;
a second image buffer for storing received imagery inputs to be plotted during respective update phases of a second image refresh period, subsequent to the first image refresh period;
a display control configured:
to receive via an input a first imagery input defining a first portion of an image to be displayed during update phases beginning at a first update phase of the first image refresh period, to store the first imagery input in the first image buffer and to generate and to output to the display device image data for setting the state of one or more pixels for displaying the first portion of an image during each update phase of a display period beginning with the first update phase of the first image refresh period;
to receive via the input a second imagery input defining a second portion of an image to be displayed during update phases beginning at a second update phase of the first image refresh period, different from the first update phase, to store the second imagery input in the first image buffer and to generate and to output to the display device image data for setting the state of one or more pixels for displaying the second portion of an image, mixed according to predetermined mixing criteria with the respective one or more pixels displaying the first portion of an image, during each update phase of a display period beginning with the second update phase of the first image refresh period;
at the first update phase of the second image refresh period, to allow the state of the one or more pixels displaying the first portion of an image to be reset or, to the extent that the one or more pixels for displaying the first portion of an image are displaying, according to the predetermined mixing criteria, the second portion of an image,
to continue to generate and to output to the display device image data for setting the state of the one or more pixels for displaying the second portion of an image during each update phase of the display period beginning with the second update phase of the first image refresh period, and/or
to receive via the input a third imagery input defining a third portion of an image to be displayed during update phases beginning at the first update phase of the second image refresh period, to store the third imagery input in the second image buffer and to generate and to output to the display device image data for setting the state of one or more pixels for displaying the third portion of an image during a display period beginning with the first update phase of the second image refresh period mixed, according to the predetermined mixing criteria, with the one or more pixels displaying the second portion of an image defined according the second imagery input, copied from the first image buffer; and
at the second update phase of the second image refresh period, to allow the state of the one or more pixels displaying the second portion of an image to be reset or, to the extent that the one or more pixels for displaying the second portion of an image are displaying, according to the predetermined mixing criteria, the third portion of an image, to continue to generate and to output to the display device image data for setting the state of the one or more pixels displaying the third portion of an image during each update phase of the display period beginning with the first update phase of the second image refresh period.

16. The plotter as claimed in claim 15, wherein each of the display period beginning with the first display period and the display period beginning with the second display period are equal in duration to at least one of the first and the second image refresh periods.

17. The plotter as claimed in claim 15, wherein each of the display period beginning with the first display period and the display period beginning with the second display period is approximately 20 milliseconds.

* * * * *